United States Patent [19]

Kitai et al.

[11] 4,217,049

[45] Aug. 12, 1980

[54] SHUTTER BLADE CONTROL DEVICE FOR AUTOMATIC FOCUSING CAMERA

[75] Inventors: Kiyoshi Kitai; Yukio Morino; Shogo Kato; Ichiro Nemoto, all of Yotsukaido, Japan

[73] Assignee: Seiko Koki Kabushiki Kaisha, Tokyo, Japan

[21] Appl. No.: 961,724

[22] Filed: Nov. 17, 1978

[30] Foreign Application Priority Data

Nov. 18, 1977 [JP] Japan ................. 52/138737

[51] Int. Cl.² .............................. G03B 3/00
[52] U.S. Cl. .................................... 354/195
[58] Field of Search .............. 354/25, 195, 196, 197, 354/198, 199, 200, 201, 266

[56] References Cited

U.S. PATENT DOCUMENTS 3,714,871  2/1973  Bresson .................. 354/25

Primary Examiner—Michael L. Gellner
Attorney, Agent, or Firm—Robert E. Burns; Emmanuel J. Lobato; Bruce L. Adams

[57] ABSTRACT

In an automatic focusing camera, a shutter blade control device comprises a first movable actuating member for controlling a focusing member, a second movable actuating member for controlling a shutter blade control member and a delay device mounted on one of the two actuating members and engaged with the other actuating member to regulate the movement of the two actuating members with respect to each other. In operation, one actuating member is held stationary and the movement of the other is under the action of the delay device. Thereafter, the other actuating member is stationary and the one actuating member moves under the action of the delay device.

4 Claims, 5 Drawing Figures

SHUTTER BLADE CONTROL DEVICE FOR AUTOMATIC FOCUSING CAMERA

BACKGROUND OF THE INVENTION

This invention relates to a shutter blade control device for an automatic focusing camera.

The automatic focusing camera is capable of automatically focusing a photographic lens by a system actuated by a signal provided by a focus detection module upon the detection of the distance between the photographic object and the camera. The photographic lens is focused by stopping a focusing member which regulates the position of the photographic lens when a focus detection signal is provided by the focus detection module, however, in practice, there is a time lag between the signaling and the actual stopping of the focusing member as the focusing member is moving fast before it is stopped, so that accurate focusing is impossible, requiring compensation of the time lag. In addition, when a member moving at a high speed is stopped in a moment, the stopping member receives a shock so that the life of the stopping member will be shortened.

SUMMARY OF THE INVENTION

A first object of the present invention is to provide a delay device to delay the movement of the focusing member so that a more accurate focus detection is attained by minimizing the distance of false movement of the focusing member after a top signal is given, and also to extend the life of the stop member by reducing the shock provided to the stop member, wherein the delay device is adapted to act on a shutter blade control member after the automatic focus detection so as to gradually operate the shutter blade to open the aperture so that the device suitably applies to program the shutter.

A second object of the present invention is to provide a delay device which is made idle before a film winding lock cancellation signal is given to provide a stronger film winding lock cancellation strength.

In order to attain the objects the shutter blade control device according to the present invention comprises a first actuating member for controling a focusing member which regulates the position of the photographic lens, a second actuating member for controlling a shutter blade control member and a delay device secured on either of the actuating members and interlocked with the other and adapted to perform delaying action according to the phase difference between the actuating members, wherein delay device is adapted to function on the first actuating member before the second actuating member is started and after the first actuating member has moved through its operating stroke, the delay device functions on the second actuating member, the second actuating member being released after the first actuating member has travelled into its final operating range while the delay device is made idle.

DETAILED DESCRIPTION OF THE INVENTION

Figure 1:
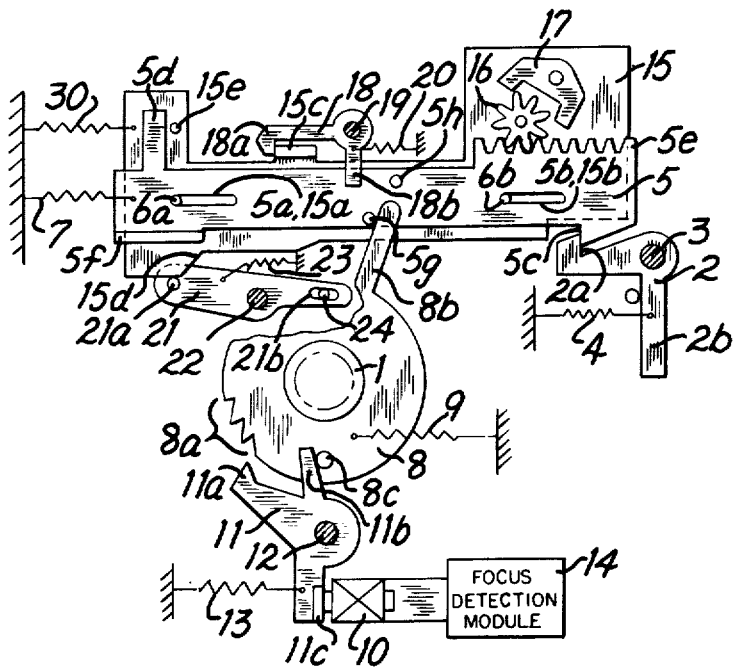
FIG. 1 is a schematic plan view of a first embodiment according to the present invention in the charged state.

Referring to FIG. 1, illustrating schematically a preferred embodiment of the present invention in the charged state, an aperture (1) is provided on a base plate, not shown. A release lever (2) having a detent (2a) and an arm (2b) is fitted on a pivot (3) fixed on the base plate and is urged clockwise by a spring (4). A first actuating member (5) is guided on the base plate by pins (6a) and (6b) fitted within slots (5a) and (5b), respectively, and is urged leftwards by a spring (7). The first actuating member (5) has an edge (5c) for receiving the detent (2a) of the release lever (2), an arm (5d), a rack part (5e), a raised part (5f) and pins (5g) and (5h). A focusing member (8) for regulating the position of the photographic lens, having a ratchet part (8a), an arm (8b) engaging with the pin (5g) of the first actuating member (5) and a pin (8c), is urged counterclockwise by a spring (9). A focus detection module (14) controls an electromagnet (10). An armature lever (11) having a detent (11a) which engages with the ratchet (8a) of the focusing member (8) when the focus position is detected, an arm part (11b) engaging with pin 8c and at which the armature lever (11) is pushed in recharging the device so that the detent (11a) is disengaged from the ratchet and the armature lever is pushed against the electromagnet (10), and an armature piece (11c) positioned opposite the electromagnet (10), is reciprocable about a pivot (12) fixed on the base plate and is urged clockwise by a spring (13). A second actuating member (15) having a raised part (15c), a cam part (15d) and a pin (15e) which engages with the arm part (5d) of the first actuating member (5) in the recharging operation, is guided by the pins (6a) and (6b) fixed on the base plate and fitted in the slots (15a) and (15b), respectively, and is urged leftwards by a spring (30). On the second actuating member (15) are provided an anchor (17) and an escape wheel (16) engaging with the rack (5e) of the first actuating member (5). the anchor (17) and the escape wheel (16) serves as a delay device. A second release lever (18), having a hook part (18a) retaining the second actuating member (15) at the raised part (15c) and an arm part (18b) which is to be actuated by the pin (5h) of the first actuating member (5), is reciprocable about a pivot (19) fixed on the base plate and is urged counterclockwise by a spring (20). A shutter blade control member (21), having a pin (21a) which follows the contour of the cam (15d) of the second actuating member (15) and a slot (21b) engaged with a pin (24) of the shutter blade, is reciprocable about a pivot (22) fixed on the base plate and is urged clockwise by a spring (23).

Figure 2:
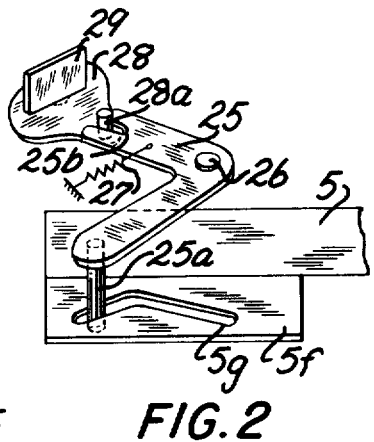
FIG. 2 is a partial perspective view of FIG. 1.

Referring to FIG. 2, illustrating in perspective the interconnection of the raised part (5f) of the first actuating member (5) and the focus detecting movable mirror (29), the raised part (5f) of the first actuating member (5) is provided with a groove (5g). An interlocking lever (25), having a pin (25a) fitted in and guided by the groove (5g) and a forked part (25b), is reciprocable about a pivot (26) and is urged counterclockwise by a spring (27). A mirror lever (28) has a mirror (29) for focus detection and a pin (28a) engaged with the forked part (25b) of the interlocking lever (25).

Figure 3:
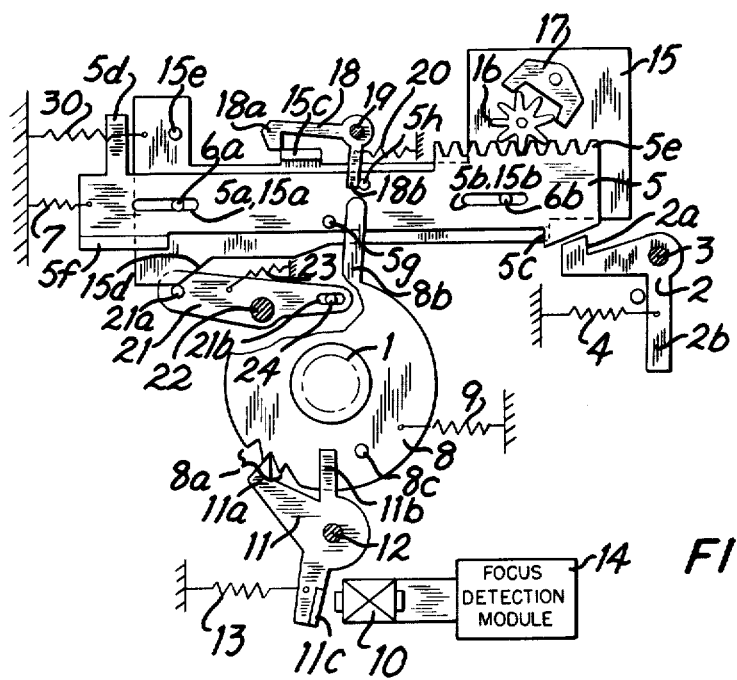
FIGS. 3 and 4 are schematic plan views of the device as shown in FIG. 1 in the operating state.

FIG. 3 illustrates the device of FIG. 1 in operation wherein the first actuating member has started and the second actuating member has just been released.

Figure 4:
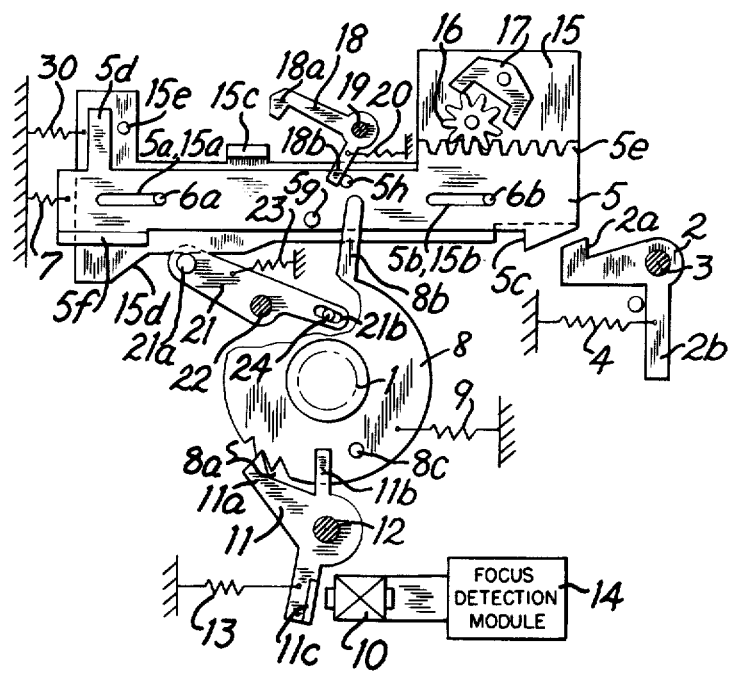

FIG. 4 illustrates the device in operation wherein the second actuating member has moved a distance sufficient to actuate the shutter blade to open.

Figure 5:
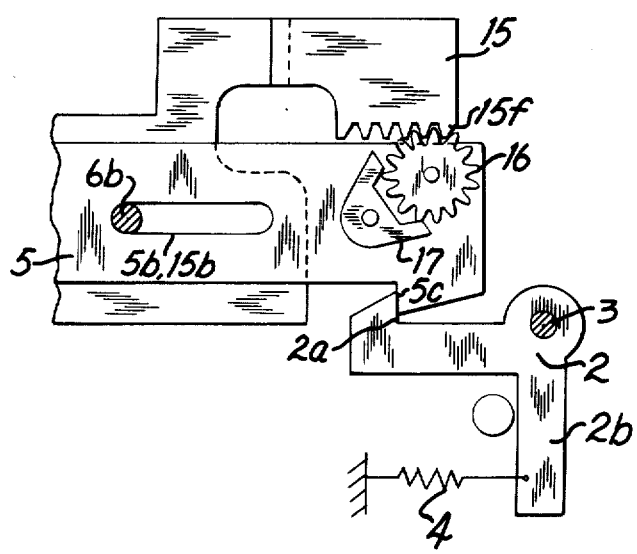
FIG. 5 is a schematic plan view of a second embodiment according to the present invention.

FIG. 5 is a schematic plan view of a second embodiment according to the present invention wherein a delay device comprising an escape wheel (16) and an anchor (17) are provided on the first actuating member and a rack (5e) is provided on the second actuating member.

In operation, starting from the charged state, the retention of the first actuating member (5) at the edge (5c) with the detent (2a) of the release lever (2) is cancelled by turning the release lever (2) counterclockwise against the spring force provided by the spring (4) so that the first actuating member (5) starts moving leftwards pulled by the spring (7). At this time, the first actuating member (5) moves at a controlled speed under the control of the delay device composed of the escape wheel (16) and the anchor (17) because the second actuating member (15) is retained by the engagement of the hook (18a) of the second release lever (18) with the raised part (15c). In the initial stage of the movement of the first actuating member (5), the pin (25a) of the interlocking lever (25) moves following the shape of the groove (5g) of the raised part (5f) of the first actuating member (5) so that the interlocking lever (25) is turned clockwise against the spring force provided by the spring (27), consequently, the movable mirror (29) for focus detection is turned from a situation directing the infinite range towards a situation directing the shortest range while performing the focus detection. The focus detection information provided by the movable mirror (29) is temporarily memorized by the focus detection module. On the other hand, the focusing member (8) is turned counterclockwise, against the spring force provided by the spring (9) according to the movement of the first actuating member (5), by the engagement of the pin (5g) of the first actuating member (5) with the arm part (8b). Although the pressing of the armature lever (11) with the pin (8c) of the focusing member (8) against the electromagnet (10) is cancelled according to the movement of the first actuating member (5), the armature lever (11) remains attracted by the electromagnet (10) as the electromagnet (10) is magnetized. According to the successive leftward movement of the first actuating member (5), the movable mirror (29) is turned from a situation directing to the nearest range towards a situation directing to the infinite range, and during this return motion of the movable mirror (29), the focus detection module is actuated to provide a signal to demagnetize the electromagnet (10) when the movable mirror (29) is returned to the situation corresponding to previously memorized position, consequently, the armature lever (11) is released to turn clockwise pulled by the spring (13) so that the the detent (11a) is engaged with a ratchet (8a) of the focusing member (8) to stop the focusing member (8) at the focus position. The first actuating member moves leftwards still further, then the pin (5h) hits against the arm part (18b) to turn the second release lever (18) clockwise cancelling the retention of the second actuating member (15) at the raised part (15c) with the hook part (18a) so that the second actuating member (15) starts moving leftwards with the escape wheel engaged with the rack (5e) of the first actuating member (5). Accordingly, the delay device composed of the escape wheel (16) and the anchor (17) does not function while the first actuating member (5) and the second actuating member (15) are moving at the same time.

After the first actuating member (5) is stopped, limited by the slots (5a) and (5b), the second actuating member (15) moves leftwards alone at a controlled speed under the control of the delay device. The shutter blade is operated through a known mechanism engaged with the shutter blade control member (21) at the slot (21b), however, the clockwise rotation of the shutter blade control member (21) urged by the spring (23) is obstructed by the engagement of the cam part (15d) of the second actuating member (15) with the pin (21a) of the shutter control member (21). As the second actuating member (15) moves leftwards at a controlled speed, the shutter blade control member (21) is allowed to turn clockwise at a speed subject to the shape of the cam part (15d) and the speed of the second actuating member (15) opens the shutter blade gradually until it turns to the position as shown in FIG. 4. And then, after a fixed period of time, the shutter blade control member (21) is turned counterclockwise against the spring force provided by the spring (23) by a known means, not shown, to complete the exposure. The whole process of the exposure operation is completed when the second actuating member reached the position limited by the slots (15a) and (15b).

In recharging the device, the first actuating member (5) is moved rightwards against the spring force provided by the spring (7), while the second actuating member (15) also is moved rightwards against the spring force provided by the spring (30) by the engagement of the arm part (5d) of the first actuating member (5) with the pin (15e) of the second actuating member (15). The charging is completed when the second actuating member (15) is retained by the engagement of the hook part (18a) of the second release lever (18) with the raised part (15c) of the second actuating member (15) and the first actuating member (5) is retained by the engagement of the detent (2a) of the release lever (2) with edge (5c) of the first actuating member(5). During this charging operation, the pin (5g) of the first actuating member pushes the focusing member (8) at its arm part (8b) so that the pin (8c) of the focusing member (8) presses the armature lever (11) against the electromagnet (10). The charging movement of the first actuating member (5) causes the movable mirror (29), shown in FIG. 2, to return to its original position. FIG. 5 is a schematic plan view of a second embodiment according to the present invention wherein the delay device comprising an escape wheel (16) and an anchor (17) is provided on the first actuating member (5) while a rack engaging with the escape wheel (16) is provided on the second actuating member (15). The performance of the second embodiment is identical with the first embodiment as shown in FIGS. 1 to 4, therefore, a further explanation will be omitted to avoid duplication.

Although the focus detection is practiced by the reciprocation of the movable mirror (29) in the preferred embodiments according to the present invention, it is to be understood that the object of the present invention is attained if the focus detection is practiced by any means other than the movable mirror (29).

It may be well understood from what has been described hereinbefore that the present invention not only provides a camera which is simply constructed with less component parts and reduced manufacturing costs since a single delay device is commonly used for controlling the operation of the focus detection member and the shutter blade operating member but also provides a sufficient force for cancelling the film winding lock and the retention of the shutter blade as the delay device is rendered idle so that movement of the first actuating member is possible at a higher speed when the first actuating member and the second actuating member move simultaneously after the second actuating member is released, while in charging operation, the delay device is also rendered idle as the first actuating member and the second actuating member move simultaneously so that the charging force is reduced.

We claim:

1. A shutter blade control device for an automatic focusing camera capable of automatically focusing the photographic lens by a system actuated by a signal produced by a focus detection module when the distance between the object to be photographed and the camera is detected, comprising a first actuating member for controlling a focusing member which regulates the position of the photographic lens, a second actuating member for controlling a shutter blade control member, a delay device secured on one of said actuating members and interlocked with the other and operative to perform delaying action with respect to the phase difference between said actuating members, and means controlling the actuating members so that the delay device acts on said first actuating member before the second actuating member is started and after the first actuating member has moved through its operating stroke, the delay device acts on said second actuating member.

2. A shutter blade control device, as set forth in claim 1, wherein the means controlling the actuating members releases said second actuating member after said first actuating member has travelled into its final operating range, during which period said delay device is made idle.

3. In an automatic focusing camera including a focusing member which controls the position of the lens, a shutter blade control member and a shutter blade control device for actuating the shutter after the lens has been focused, the improvement wherein the shutter blade control device comprises a first movable actuating member for controlling the focusing member, a second movable actuating member for controlling the shutter blade control member, delay means mounted on one of the two actuating members and engaged with the other actuating member to regulate the movement of the two actuating members with respect to each other, and means controlling the two actuating members to hold one actuating member stationary and to effect movement of the other actuating member under the action of the delay means and to thereafter hold the other actuating member stationary and to effect movement of the one actuating member under the action of the delay means.

4. The shutter blade control device according to claim 3; wherein the first and second actuating members are mounted for linear sliding movement between a changed and a rest position, and wherein the means controlling the two actuating members holds the second actuating member stationary in its charged position until the first actuating member has substantially travelled to its rest position and thereafter holds the first actuating member in its rest position until the second actuating member has travelled to its rest position, and wherein the delay means is deactivated during the period when the first actuating member travels into its rest position and the second actuating member is enabled to move therewith.

* * * * *